(12) United States Patent  
Hutchison et al.

(10) Patent No.: US 7,821,422 B2  
(45) Date of Patent: Oct. 26, 2010

(54) TRAFFIC LIGHT SIGNAL SYSTEM USING RADAR-BASED TARGET DETECTION AND TRACKING

(75) Inventors: Michael C. Hutchison, Plano, TX (US); James A. Pautler, Plano, TX (US); Mark A. Smith, Dallas, TX (US)

(73) Assignee: Light Vision Systems, Inc.

( * ) Notice: Subject to any disclaimer, the term of this patent is extended or adjusted under 35 U.S.C. 154(b) by 1640 days.

(21) Appl. No.: 10/920,743

(22) Filed: Aug. 18, 2004

(65) Prior Publication Data

US 2005/0046597 A1     Mar. 3, 2005

Related U.S. Application Data

(60) Provisional application No. 60/496,072, filed on Aug. 18, 2003, provisional application No. 60/497,034, filed on Aug. 22, 2003.

(51) Int. Cl.  
*G08G 1/095* (2006.01)

(52) U.S. Cl. .................. 340/907; 701/301; 348/149

(58) Field of Classification Search ............ 340/907, 340/916, 917, 921, 923, 933, 937; 701/301; 348/149  
See application file for complete search history.

(56) References Cited

U.S. PATENT DOCUMENTS

| 3,149,306 | A | 9/1964 | Lesher |
| 3,196,386 | A | 7/1965 | Rossi et al. |
| 3,302,168 | A | 1/1967 | Gray et al. |
| 3,613,073 | A | 10/1971 | Clift |
| 3,689,878 | A | 9/1972 | Thieroff |
| 3,693,144 | A | 9/1972 | Friedman |
| 3,731,271 | A | 5/1973 | Muramatu et al. |
| 3,810,084 | A | 5/1974 | Hoyt, Jr. |
| 3,858,223 | A | 12/1974 | Holzapfel |
| 3,866,165 | A | 2/1975 | Maronde et al. |
| 3,885,227 | A | 5/1975 | Moissl |
| 3,886,515 | A | 5/1975 | Cottin et al. |
| 3,920,987 | A | 11/1975 | Martin et al. |
| 3,921,127 | A | 11/1975 | Narbaits-Jaureguy et al. |

(Continued)

FOREIGN PATENT DOCUMENTS

WO     WO 94/28527     12/1994

OTHER PUBLICATIONS

Eaton VORAD Collision Warning System, Eaton VORAD Technologies, LLC, Galesburg, Michigan.

(Continued)

*Primary Examiner*—John A Tweel, Jr.  
(74) *Attorney, Agent, or Firm*—Robert C. Klinger (57) ABSTRACT

A novel system and method of integrating an RF emissions device, such as a radar system (103A), within a traffic control indicator (101) system. The system and method determines, using LFM-CW radar signals (201) and a multi-stage spectral processing algorithm (600), if one or more object/vehicle targets will enter an intersection and comprises receiving a radar echo response (203) indicating the object/vehicle target (104) is approaching the intersection, receiving range and velocity of the object/vehicle targets (104), and based on the receiving, determining if the object/vehicle target (104) will enter the intersection. The system and method can programmatically be configured to activate red-light-hold, green-light-extension, or left-turn-warning.

65 Claims, 7 Drawing Sheets

U.S. PATENT DOCUMENTS

| | | | |
|---|---|---|---|
| 4,122,523 | A | 10/1978 | Morse et al. |
| 4,200,860 | A | 4/1980 | Fritzinger |
| 4,228,419 | A | 10/1980 | Anderson |
| 4,361,202 | A | 11/1982 | Minovitch |
| 4,371,863 | A | 2/1983 | Fritzinger |
| 4,401,969 | A | 8/1983 | Green et al. |
| 4,884,072 | A | 11/1989 | Horsch |
| 4,887,080 | A | 12/1989 | Gross |
| 5,041,828 | A | 8/1991 | Loeven |
| 5,161,107 | A | 11/1992 | Mayeaux et al. |
| 5,164,998 | A | 11/1992 | Reinsch |
| 5,278,554 | A | 1/1994 | Marton |
| 5,283,573 | A | 2/1994 | Takatou et al. |
| 5,339,081 | A | 8/1994 | Jefferis et al. |
| 5,345,232 | A | 9/1994 | Robertson |
| 5,387,908 | A | 2/1995 | Henry et al. |
| 5,432,547 | A | 7/1995 | Toyama |
| 5,440,109 | A | 8/1995 | Hering et al. |
| 5,444,442 | A | 8/1995 | Sadakata et al. |
| 5,530,441 | A | 6/1996 | Takatou et al. |
| 5,774,569 | A | 6/1998 | Waldenmaier |
| 5,777,564 | A | 7/1998 | Jones |
| 5,801,646 | A | 9/1998 | Pena |
| 5,821,878 | A | 10/1998 | Raswant |
| 5,948,038 | A | 9/1999 | Daly et al. |
| 5,977,883 | A | 11/1999 | Leonard et al. |
| 6,008,741 | A | 12/1999 | Shinagawa et al. |
| 6,085,151 | A * | 7/2000 | Farmer et al. ............... 701/301 |
| 6,100,819 | A | 8/2000 | White |
| 6,111,523 | A | 8/2000 | Mee |
| 6,281,808 | B1 | 8/2001 | Flier et al. |
| 6,426,704 | B1 | 7/2002 | Hutchison |
| 6,450,662 | B1 | 9/2002 | Hutchison |
| 6,587,778 | B2 * | 7/2003 | Stallard et al. ............... 701/117 |
| 6,633,238 | B2 * | 10/2003 | Lemelson et al. ........... 340/909 |
| 6,850,171 | B2 * | 2/2005 | Mathias ..................... 340/907 |
| 6,914,541 | B1 * | 7/2005 | Zierden ...................... 340/937 |
| RE38,870 | E * | 11/2005 | Hall .......................... 701/301 |
| 7,012,547 | B2 * | 3/2006 | Hassett ....................... 340/928 |
| 2002/0054210 | A1 * | 5/2002 | Glier et al. .................. 348/149 |

OTHER PUBLICATIONS www.dot.ca.gov/research, Division of Research and Innovation, 2000 State of California, pp. 1-4.

Misener, Jim, www.path.berkeley.edu/PATH, Intersection Decision Support Project Seeks to Prevent Broadside Crashes, pp. 1-7.

www.nawgits.com, Newsletter of the ITS Cooperative Deployment Network, Inside the USDOT's "Intelligent Intersection" Test Facility, p. 1-7.

Bonneson, James, Middleton, Dan, Zimmerman, Karl, Charara, Hassan and Abbas, Montasir, Intelligent Detection-Control System for Rural Signalized Intersections, Research Project, Texas Transportation Institute, Aug. 2002.

* cited by examiner

TRAFFIC LIGHT SIGNAL SYSTEM USING RADAR-BASED TARGET DETECTION AND TRACKING

CLAIM OF PRIORITY

The present application is related to and claims the benefit of U.S. Provisional Patent Application No. 60/496,072 filed Aug. 18, 2003, and entitled "SOLID STATE TRAFFIC LIGHT SIGNAL WITH RED LIGHT HOLD", the teachings of which are incorporated by reference herein. The present application is further related to and claims the benefit of U.S. Provisional Patent Application No. 60/497,034 filed Aug. 22, 2003, and entitled "SOLID STATE TRAFFIC LIGHT SIGNAL WITH RADAR ACQUISITION," the teachings of which are incorporated by reference herein.

FIELD OF THE INVENTION

The present invention is directed to traffic control indicators for controlling automobile traffic in an intersection, and more particularly to radar transceivers used in combination with traffic lights for controlling light signals as a function of vehicles approaching or entering an intersection. As used herein, traffic control indicator means any indicator used to control, notify, or alert vehicle or pedestrian traffic, including but not limited to traffic signals, traffic lights, lights, flashing lights, LED arrays, messages, and other vehicle or pedestrian traffic warning and control indicators. Likewise, the use of a term such as light, light signal, traffic signal and the like is not meant to be limiting, but rather is intended to cover any type of traffic control indicator. The use of terms to generally describe components of the invention, such as lights, is not meant to be limiting. For example, the term lights, means any indicator, such as light bulbs, LED arrays and the like that is an emitted signal intended to notify a recipient of the status thereof and of a particular set of circumstances.

BACKGROUND OF THE INVENTION

Traffic control indicators are used to efficiently control vehicle and pedestrian traffic through along roadways, sidewalks and the like and through crossings and intersections. While traffic signals have been in use for many years, improvements continue to be made in the areas of object/vehicle target sensing and detection, traffic control algorithms and traffic volume detection.

Each year there are thousands of accidents, resulting in numerous injuries and deaths, at roadway intersections due to vehicle drivers running red lights (referred to herein as "Red Light Running" or "RLR"). While solutions exist for identifying and ticketing the offenders, there is an increasing need to prevent the occurrence of such accidents in the first place.

A solution to reduce the occurrence of accidents due to vehicle RLR is to hold the cross-traffic red light during such occurrence. The technology that implements this functionality is typically referred to as Red Light Hold ("RLH"). RLH senses that a driver in a vehicle is going to engage in RLR and maintains the red light on cross traffic until the offending driver has exited the intersection.

Most of the serious RLR accidents occur when an offending vehicle enters the intersection between 3 and 8 seconds after the signal turns red. Thus, assuming there is 100 to 200 feet of intersection in front of the traffic signal, a system implementing RLH functionality must be able to detect object/vehicle targets approximately 800 feet from where the traffic signal is mounted in order to implement RLH effectively. In order to determine if the vehicle is going to enter the intersection at a dangerous time, the RLH system must be able to determine the distance and velocity of the approaching vehicle. In many intersections, the cross-traffic green light is delayed a second or two in the all-red condition to provide some safety margin. These green light delays may be longer in higher-speed intersections where RLR object/vehicle targets might travel in excess of 70 mph.

Several systems have been devised that attempt to implement RLH technology. However, these systems failed in field trials since they are based on sensors that do not provide adequate information to a RLH decision algorithm. The system disclosed in U.S. Pat. No. 6,281,808 to Nestor ("Nestor") is based on video cameras monitoring incoming vehicles. Disadvantageously, the video cameras could only detect the position and velocity of a vehicle within a few hundred feet of the video camera mounted in close proximity to the traffic signal. As a result, this system is unable to prevent most RLR accidents. Another system described U.S. Pat. No. 6,100,819 to White ("White") suggests using multiple loop sensors built into the pavement. However, disadvantageously, these sensors simply detect the presence of a vehicle above them. Thus, vehicles can only be detected at places in the roadway where sensors are installed resulting in a limited view of the incoming traffic. Furthermore, these loop sensors are expensive to install and maintain. A system employing one or two loop detectors on an intersection approach is not capable of making consistently accurate RLH decisions. To implement a functional RLH system whereby velocity and range information is obtained over a large portion of the roadway, loop sensors must be installed in each lane of the road every 10 feet for 800 feet. This is impractical in terms of installation cost, reliability, and maintenance cost.

Another algorithm in traffic engineering known as Green Light Extension (referred to herein as "GLE") is designed to prevent accidents and make the roadways more efficient. GLE refers to dynamically extending the duration of a green light to allow all of the vehicles in a group to pass through the intersection. Ideally, the light should turn red when no more vehicles are close to entering the intersection. Nevertheless, there are times when a sufficient break in traffic is not available. While a GLE system will tend to stop traffic during a break or reduction in approaching traffic, it also will typically have a maximum extension period that will timeout, thus ending the GLE, if no breaks are detected.

There are several benefits to GLE. Because lights are more likely to turn red when no vehicles are approaching, the number of potential red light runners decreases significantly. It is distinguishable from RLH in that GLE can reduce the number of red light runners, while RLH is a means of protecting cross-traffic from cars that actually engage in RLR. In addition, some drivers will stop abruptly when the light turns yellow causing trailing vehicles to rear end them. If the green light is extended using GLE, it will reduce the number of rear-end collisions that occur in intersections. In addition to making intersections safer, GLE reduces the amount of wear on the pavement in front of the intersections. For instance, large trucks that are forced to stop at the intersection present a significant loading on the pavement for the duration of the red light, with the result that cities are required to make pavement repairs more often for intersections that carry a high volume of truck traffic. Systems that are able to detect oncoming trucks and extend the green light so they can pass will extend the life of the pavement. Additionally, such systems help conserve energy and reduce emissions as GLE results in trucks stopping and starting less often, which results in greater fuel efficiency. Thus, GLE can help save limited natural resources as well as assist in preserving the environment.

Due to the potential benefits, GLE is an active field of research in traffic engineering. However, conventional systems that implement GLE use multiple loop sensors that are built into the pavement. As noted above, these sensors are expensive to install and maintain, and furthermore, are limited in their ability to detect information about vehicles as these sensors simply detect the presence and speed of a vehicle. Because vehicles can only be detected at places in the roadway where sensors are installed, a limited view of the incoming traffic is presented. Algorithms that determine GLE time will perform better when more sensors are present, however, the number of conventional sensors required make such a system inefficient.

In addition, there are many accidents each year resulting from drivers of vehicles making unprotected left turns (referred to herein as "ULT") across approaching, oncoming traffic or crossing traffic. Due to the geometry of certain intersections, the presence of cars in the opposing left turn lane can block the view of drivers attempting to make a left turn. Even though visibility is significantly reduced, many drivers will still attempt the blind left turn.

One means of reducing the occurrence of accidents due to ULTs is to signal a driver in the left turn lane that another object/vehicle target is approaching from the other direction at such a distance and velocity such that it is unsafe to proceed. The technology that implements this functionality is referred to herein as Left Turn Warning ("LTW"). LTW senses that a driver in an oncoming or crossing object/vehicle target is going to approach the intersection within a certain time frame such that the left turning vehicle is put at risk if it is in the intersection. LTW warns the driver making the ULT that it is not safe to turn.

Adaptive warning signals to drivers have been discussed in the traffic engineering literature. Such signs can be attached near the typical traffic signal stack or can be located on the opposite corner of the intersection where it would be readily visible by drivers attempting to turn. Preferably, the signal would only warn drivers that vehicles are approaching and that conditions are dangerous for turning, not inform drivers that it is safe to turn.

An algorithm that processes information about vehicles approaching the intersection controls these left turn warning signals. Sensors such as loop detectors in the pavement can provide a limited amount of information. As is the case with GLE and RLH, the warning algorithm will perform better when vehicle range and velocity information is available for input into the algorithm.

There is a need for a radar-based sensor capable of detecting, characterizing and tracking an incoming object/vehicle target or a group of incoming object/target vehicles over the large viewing range of the radar. With such a sensor, object/vehicle targets could be detected at around 1000 feet and tracked until they pass through the intersection. With such a sensor, information about object/vehicle target distance, velocity, acceleration, and return-signal magnitude over the entire viewable roadway can be passed to a RLH, GLE, or LTW algorithm. All of this information can be provided from a single sensor per traffic approach direction mounted in the intersection. Such a sensor could enable efficient and precise RLH, GLE, or LTW algorithms with low installation and maintenance costs.

SUMMARY OF THE INVENTION

The present invention achieves technical advantages as an improved radio frequency (RF) emission, or radar, system integrated within a traffic light signaling system adapted to determine, among other things, (1) in advance of an RLR condition, the likely occurrence of an RLR condition, (2) the need to provide a LTW to a driver seeking to make a ULT, and (3) the nature of an approaching flow of object/vehicle targets and dynamically adjust the traffic signals so as to reduce accidents and pavement damage and conserve energy. The present invention is an improved method and apparatus to implement each of the foregoing functionalities, together, in parts or individually.

More specifically, the determination of a possible RLR condition can be used to trigger an RLH circuit to hold the cross-traffic red light until it is determined that conditions are safe to provide a green light to cross traffic. The determination of a possible collision between an oncoming vehicle with a vehicle making an ULT can be used to trigger an LTW circuit to warn the driver making the left hand turn of oncoming traffic. The LTW is turned off when the LTW circuit determines that the danger has passed. The determination of the nature of the approaching flow of object/vehicle targets can be used to trigger a GLE circuit that is operable to maintain a green traffic signal until all of the object/vehicle targets in the flow have exited the intersection. In this manner, GLE can dynamically adjust the timing of the traffic signals so as to reduce the chance of accidents and pavement damage.

Implementation of the foregoing functionalities requires the use of an RF emission and sensing apparatus, such as radar. Radar transmitters using modulated signals require receivers adapted to sense the reflected signals. The radar transceiver of the present invention uses a Linear Frequency Modulated Continuous Wave ("LFM-CW") RF signal transmission and a multi-stage spectral processing algorithm in the receiver to determine the range, velocity, and return-signal magnitude of the illuminated targets during a very short observation interval. In one embodiment, the target information collected during each observation interval is passed to a high-level tracker ("HLT") that is capable of tracking the behavior of targets over a longer period of time. The HLT can validate the presence of targets, eliminate invalid observations, and predict the future behavior of targets. The radar/traffic processor collects approaching object/vehicle target information from the HLT and traffic signal state information from the traffic signal system to determine whether to trigger the RLH, GLE or LTW functionalities. An HLT may be integrated in the radar/traffic process.

An advantage of the system and method of the present invention is that the modulated radar signal can be used to determine the range and velocity of a number of targets over a large region with high accuracy. Furthermore, the signal processing aspects of the present invention can be used in combination with innovative algorithmic methods for determining whether to trigger the RLH, GLE or LTW functionalities.

DETAILED DESCRIPTION OF THE EXEMPLARY EMBODIMENTS

Figure 1:
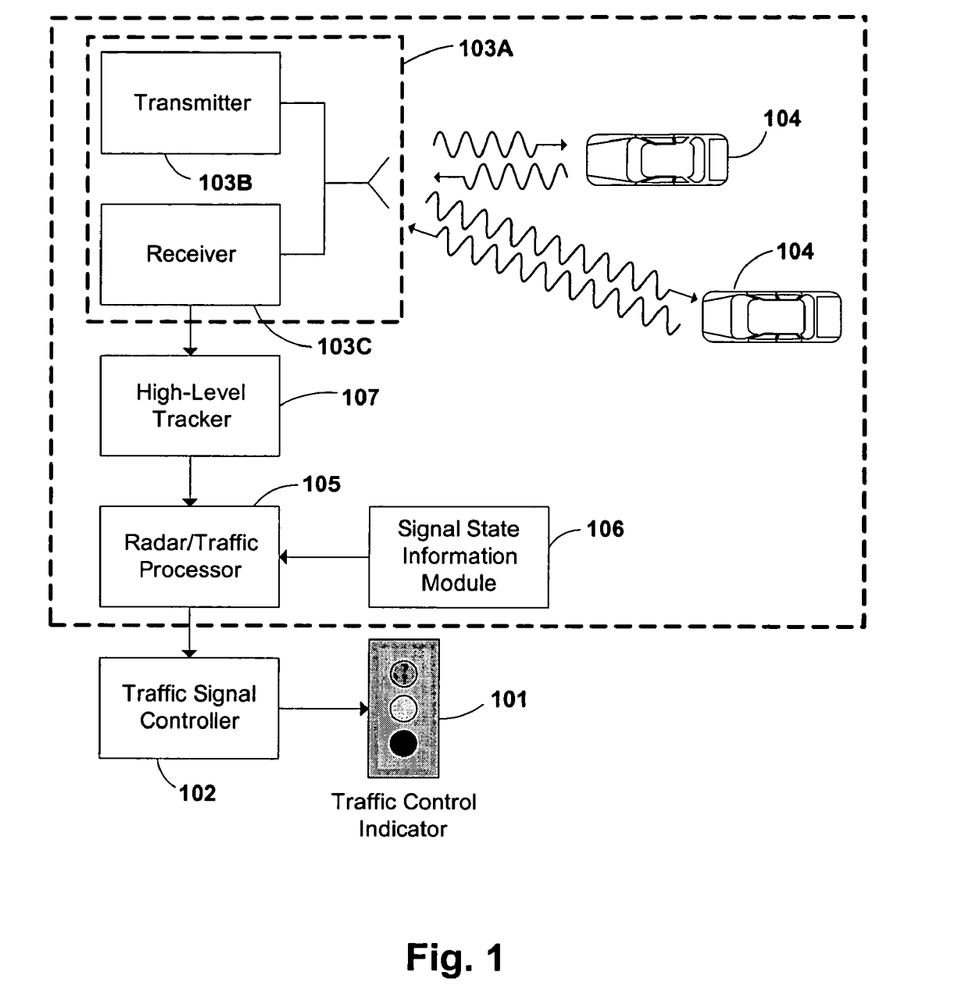
FIG. 1 is a high-level block diagram of an exemplary embodiment of the present invention.

A block diagram of one exemplary embodiment of the present invention is shown in FIG. 1. The system is implemented using at least one traffic control indicator 101 adapted to control or alert traffic at a roadway intersection. A traffic signal controller 102 coupled to the traffic control indicator 101 is adapted to change the states of the traffic control indicator 101, and is conventionally located in a controller cabinet near the intersection. An RF emissions apparatus, such as a radar 103A, is operable to transmit signals using transmitter 103B toward, and receive signals from, a plurality of object/vehicle targets 104. Object/vehicle targets 104 may include cars, trucks, motorcycles, bicycles, pedestrians, or any other type of object commonly found in or traversing an intersection. A radar/traffic processor 105 adapted to receive processed information from the RF emissions receiver apparatus, such as a receiver 103C, is coupled to both the traffic signal controller 102 and to a signal state information module 106 for at least one traffic control indicator 101. The radar/traffic processor 105 has embedded or programmed therein an algorithm operable to determine the characteristics of the object/vehicle targets 104 and dynamically cause the traffic signal controller 102 to maintain or change the states of the traffic control indicator(s) 101 in response thereto. Once the traffic signal controller 102 changes the lights, the new status of the lights is determined by signal state information module 106.

More specifically, the transmitter 103B and receiver 103C can be located within a traffic light case or mounted on the same supporting structure as the traffic light. Transmitter 103B and receiver 103C can share a single common antenna, share a plurality of common antennas, have separate antennas, or have separate pluralities of antennas. In one embodiment of the present invention, the transmitter 103B and receiver 103C are mounted in a separate enclosure on the same mast arm as the traffic light. The object/vehicle target information, including range, velocity, and signal strength, generated by the receiver 103C is communicated via a wired or wireless link to the radar/traffic processor 105 located in the traffic controller cabinet on the ground near the intersection. In general, this communication interface can include a wired, wireless, or combination of a wired and wireless connection. The traffic controller cabinet typically houses the radar/traffic processor 105 and the traffic signal controller 102. The single processing unit can provide the high level tracker ("HLT") 107 and radar/traffic processor 105 functions, or a separate HLT processor can be coupled between receiver 103C and radar/traffic processor 105.

Figure 2:
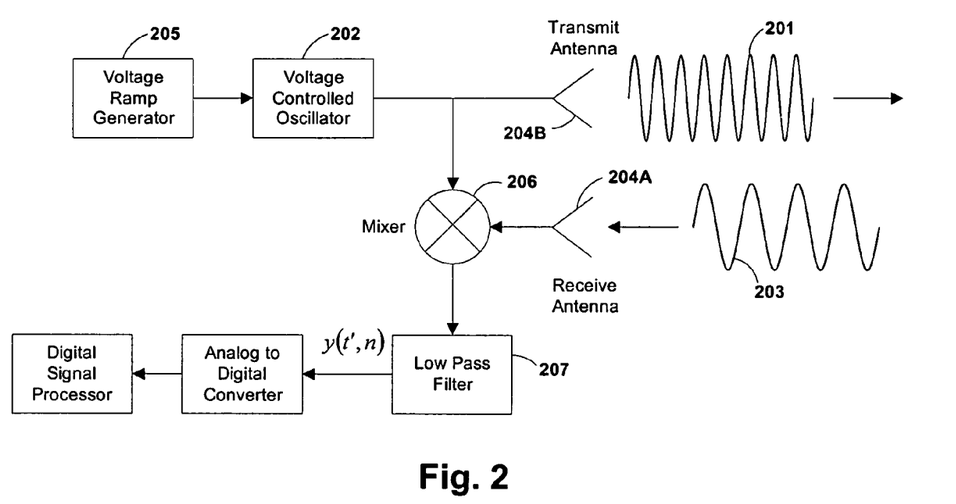
FIG. 2 is a block diagram of an LFM radar system.

Each exemplary embodiment of the present invention uses a linear frequency modulated ("LFM") continuous wave ("LFM-CW") radar system. A block diagram of an LFM radar is shown in FIG. 2. LFM systems transmit a continuous radio frequency signal 201 produced by a voltage controlled oscillator ("VCO") 202. The transmitted signal is reflected by object/vehicle targets in the radar's field of view. These reflections 203 are received by the receive antenna 204A of the radar system and processed to yield the distance and velocity of each object/vehicle target producing a significant reflection. An alternative embodiment of an LFM radar may use a Gunnplexer device to implement the combination of VCO 202, transmit antenna 204B, receive antenna 204A, and mixer 206.

The frequency of the signal produced by VCO 202 and transmitted at the transmit antenna 204B will appear as a linear ramp on a plot of frequency versus time. The voltage ramp generator 205 driving VCO 202 will compensate for any non-linearities in the VCO 202 to produce a linear ramp in frequency. As a result, the ramp in voltage driving the VCO 202 may not necessarily be linear.

Figure 3:
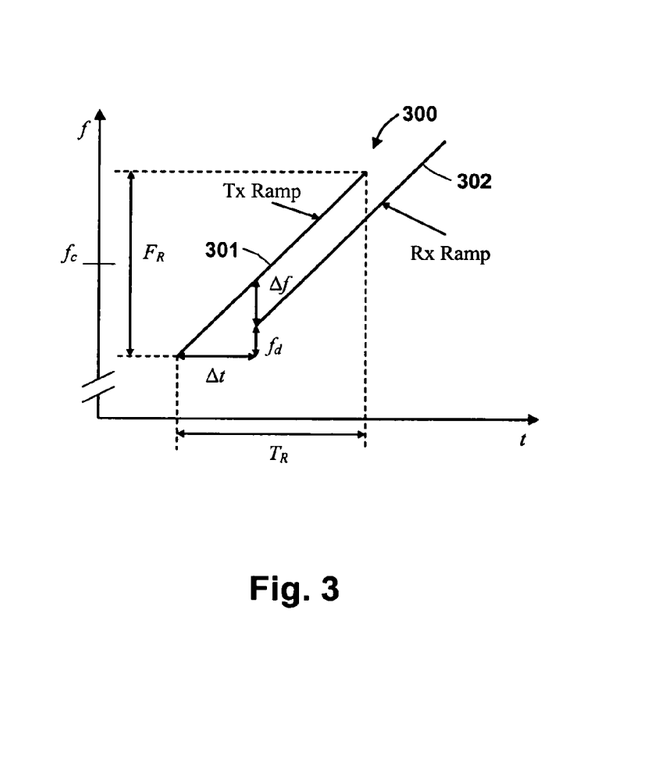
FIG. 3 is a graphical representation of transmitted signal with single return.

Referring now to plot 300 of FIG. 3, the reflected signal from an object/vehicle target, called a return, will be delayed by the time it takes the RF signal to propagate to and from the object/vehicle target. This time delay for the i-th object/vehicle target is $$\Delta t_i = \frac{2d_i}{c},$$

where $d_i$ is the distance from the radar to the object/vehicle target, and c is the speed of light in the propagation medium (air). Since there is a time difference, there will be a frequency difference between the transmitted and received signals at any instance in time. This frequency difference is $$\Delta f_i = \frac{F_R}{T_R}\Delta t_i + f_d^{(i)} = \frac{F_R}{T_R} \cdot \frac{2d_i}{c} - \frac{2v_i}{\lambda},$$

where $F_R/T_R$ is the slope of the transmitted frequency ramp 301, expressed as the total ramp frequency change (ramp ending frequency minus ramp starting frequency), $F_R$, divided by the total ramp time change, $T_R$, $f_d^{(i)}$ is the Doppler shift, $v_i$ is the velocity of the object/vehicle target in the direction of the radar, and $\lambda$ is the wavelength of the radar signal. The received signal is a copy of the transmitted signal that has been delayed in time due to the round trip propagation delay and shifted in frequency due to the Doppler Effect. Typically, the center frequency of the radar signal, $f_c$, is significantly greater than the total bandwidth of the signal, $F_R$. Therefore, the wavelength of the radar system, $$\lambda = \frac{c}{f_c},$$

is considered a constant over the entire frequency range of the ramp. Also, it is possible for the ramp to slope downward instead of upward.

The frequency difference between the transmitted and received signals from a single return is a function of an object/vehicle target's distance and velocity. Referring back to FIG. 2, the LFM radar extracts the frequency difference, $\Delta f_i$, by mixing the transmitted and received signals together at mixer 206 and then performing a low pass filter operation at low pass filter 207. The mixing function produces sinusoids with the sum and difference frequencies of the two input signals. The low pass filter 207 cuts out the high frequency sum signal and only allows the low frequency difference signal to pass. Note that the low pass filter 207 can be supplemented with a high pass filter designed to equalize signals from object/vehicle targets at long range experiencing a large propagation loss with the result that a given object/vehicle target will appear with roughly the same power level at any distance. However, measuring the frequency difference produced by a single ramp does not provide enough information to solve for both the distance and velocity of an object/vehicle target. Several pairs of distance and velocity signals can produce the same frequency difference, resulting in an ambiguity.

Various LFM systems differ in the way they resolve the ambiguity between distance and velocity. One type consists of two periods of transmission, where each period contains a different ramp slope, $F_R/T_R$. In the first period, the ramp starts at the lowest frequency and ramps to the highest ($F_R/T_R$ is positive). In the second period, the ramp is reversed by starting at the highest frequency and ending at the lowest ($F_R/T_R$ is negative). This scheme will produce two different values for $\Delta f_i$, resulting in two equations to resolve the two unknowns.

The present invention preferably utilizes an LFM system that generates a ramp with a steep slope (small ramp time) such that $$\frac{F_R}{T_R} \cdot \frac{2d_i}{c} \gg \frac{2v_i}{\lambda}.$$

Figure 4:
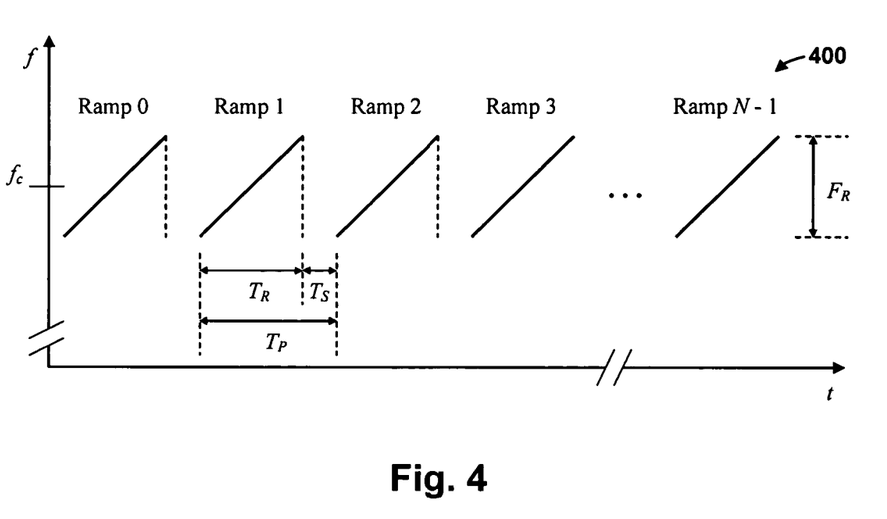
FIG. 4 is a plot of the transmission of N ramps.

The steep ramps eliminate the effect of velocity on $\Delta f_i$. The result of a single ramp will produce an accurate distance estimate, but will provide no useful information about velocity. Additional identical ramps, like the transmission 400 shown in FIG. 4, provide the missing information. The following equation describes the sinusoid at the output of the low pass filter containing the difference frequency for the n-th ramp:

$$y_i(t', n) = \alpha_i \cos\left(2\pi \frac{F_R}{T_R} \cdot \frac{2d_i}{c} t' + \frac{4\pi v_i}{\lambda} t + \varphi_0^{(i)}\right),$$
$$t = t' + nT_P,$$

where t' represents the time since the beginning of the n-th ramp, t is the time since the beginning of the first ramp (n=0), $\phi_0^{(i)}$ is the initial phase offset at t=0, $T_P$ is the time between successive ramps, and $\alpha_i$ is the amplitude of the sinusoid. These expressions assume that an additional ramp settling time, $T_S = T_P - T_R$, is allowed between successive ramps for implementation purposes. Combining the above equations yields:

$$y_i(t', n) = \alpha_i \cos\left(2\pi\left(\frac{F_R}{T_R} \cdot \frac{2d_i}{c} - \frac{2v_i}{\lambda}\right)t' + \frac{4\pi v_i}{\lambda} nT_P + \varphi_0^{(i)}\right).$$

The phase of the sinusoid $y_i(t', n)$ in the n-th ramp is:

$$\Phi_i(n) = \frac{4\pi v_i}{\lambda} nT_P + \varphi_0^{(i)}.$$

Note that the difference in phase between two ramps is:

$$\Phi_i(n+1) - \Phi_i(n) = \frac{4\pi v_i}{\lambda} T_P,$$

which is a function only of the object/vehicle target's velocity. Now, all the information is available for computing both the distance and velocity of a single object/vehicle target. Note that since the phase difference between two ramps cannot exceed $\pm\pi$ before the phase wraps around, the maximum detectable velocity is $$v_{max} = \pm\frac{\lambda}{4T_P}.$$

Also note that the system is capable of detecting both positive and negative velocities. This means that the system can tell if an object/vehicle target is approaching or departing the intersection.

The phase of a sinusoid can be measured by correlating the sinusoid with a complex phasor of known phase as shown by:

$$Z = \frac{1}{T_R}\int_0^{T_R} \cos(2\pi ft + \varphi)e^{-j2\pi ft}dt = \frac{1}{2}e^{j\varphi},$$

$$\varphi = \arctan\left(\frac{\text{Im}(Z)}{\text{Re}(Z)}\right).$$

Figure 5:
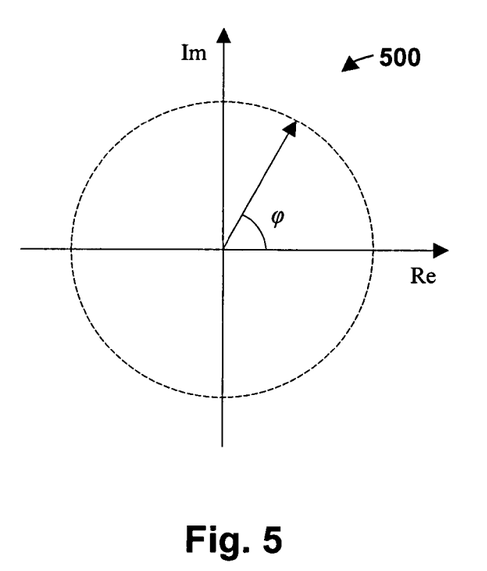
FIG. 5 illustrates a phase computation of a complex number.

The phase $\phi$ of the resulting complex number, Z, is the phase of the sinusoid of interest. The complex number Z and its phase 500 are shown graphically in FIG. 5. The same technique can be applied to $y_i(t', n)$ to extract the phase of each ramp. It is important that the frequency of the phasor is the same as the frequency of the sinusoid. If the frequency of the reference phasor is different from the sinusoid, then Z will be significantly attenuated. The above expression for Z will also be recognized as a Fourier transform. The Fourier transform is a well-known technique used to determine the magnitude and phase of frequency components present in a signal.

In general, more than one object/vehicle target will be present in the radar's field of view. Since the described system is linear, the sinusoids produced by multiple object/vehicle targets will appear as linear combinations with the composite signal is written as:

$$y(t', n) = \sum_{i=1}^{L} y_i(t', n).$$

If two object/vehicle targets are at two different distances, y(t', n) will contain sinusoids at two different frequencies. Using the Fourier transform, the magnitude and phase of each sinusoid can be determined since frequencies different from the phasor frequency will be significantly attenuated. The Fourier transform can be interpreted as a filter. When the frequency of the filter lines up with a frequency generated by an object/vehicle target, that object/vehicle target's magnitude and phase will appear at the output of the filter. Object/vehicle targets at different distances will be rejected by the filter. By scanning the frequency band with this filter, each object/vehicle target can be detected individually.

A problem exists when two object/vehicle targets are at the same distance and therefore producing the same difference frequency. However, the two object/vehicle targets may be traveling at different velocities. The Fourier transform at that frequency will reveal a magnitude and phase that is due to the summation of two object/vehicle targets:

$$Z(d,n) = \alpha_1 e^{j\Phi_1(n)} + \alpha_2 e^{j\Phi_2(n)},$$

where Z(d, n) is the complex number produced by the Fourier transform at the frequency corresponding to distance d performed on the n-th ramp. In order to determine the velocity of an object/vehicle target, the phase difference must be computed for each phasor individually as shown previously. An observation is that the phase difference is related to the angular frequency of the phasor, assuming no acceleration, by:

$$\omega_i = \frac{d}{dn}\Phi_i(n) = \Phi_i(n+1) - \Phi_i(n) = \frac{4\pi v_i}{\lambda} T_P.$$

The expression for Z(d, n) can now be written as:

$$Z(d,n) = \alpha_1 e^{j(\omega_1 n + \phi_0^{(1)})} + \alpha_2 e^{j(\omega_2 n + \phi_0^{(2)})}).$$

The complex numbers formed by a series of ramps in time consist of two complex phasors rotating at two different frequencies, $\omega_1$ and $\omega_2$. As demonstrated earlier, the Fourier transform is a technique used to determine the frequencies present in a signal comprised of a sum of sinusoids or rotating complex phasors. As such, Fourier transform can be performed on Z(d, n) to detect energy at both $\omega_1$ and $\omega_2$. Once the angular frequencies are known, the velocity can be directly computed. Also, the level of energy produced by the Fourier transform is an indication of the signal strength of the radar return from an object/vehicle target.

A digital signal processor ("DSP") can be used to perform a Fourier transform. An analog-to-digital converter ("ADC") is used to sample the waveform y(t', n) for use in the DSP. Since the waveform is now represented in discrete-time samples, a discrete Fourier transform ("DFT") is used. The DFT is expressed as:

$$X(k) = \sum_{n=0}^{N-1} x(n) \cdot e^{-j(2\pi k n/N)}, \quad k = 0, 1, \ldots, N-1$$

where N is the number of samples of the continuous time signal x, and X is the sampled (N total samples) frequency domain representation of x. A computationally efficient implementation, known as a fast Fourier transform ("FFT"), is used to compute the DFT in the DSP.

Figure 6:
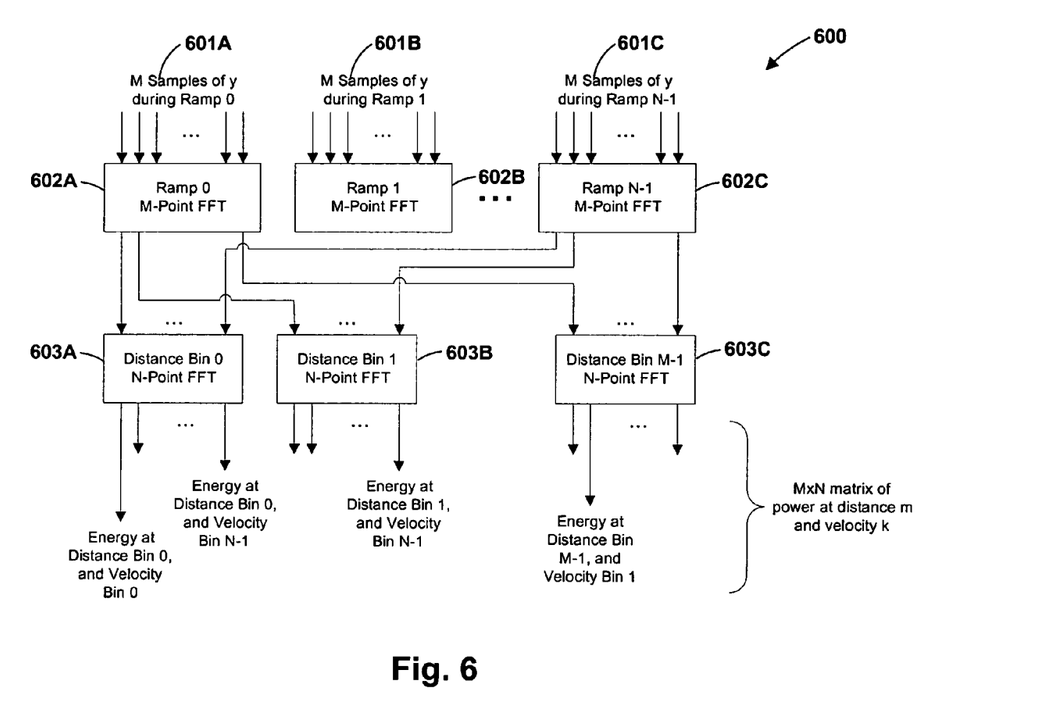
FIG. 6 illustrates a block diagram of a distance-velocity processor.

FIG. 6 is a block diagram 600 of the distance-velocity processing algorithm used in this implementation of the present invention, which is generally similar to one disclosed by Levanon and Getz, 1994. As seen therein, first, the samples of the input signal, y(t', n), (not including the settling time, $T_S$) are processed by the DSP to determine the distance to all the object/vehicle targets. This process involves a spectral analysis of the M samples of y(t', n) 601(A-C) on each ramp using an FFT 602(A-C). As seen therein, a single M-point FFT is performed on each ramp individually. A single FFT examines several frequencies and produces a complex number for each of the M individual frequencies, representing distance, examined. The theoretical range resolution provided by the FFT is:

$$\Delta d = \frac{c}{2F_R},$$

which also corresponds to the length of each distance bin at the output of the FFT 603(A-C). This quantity is independent of M. The next step is to determine the velocities of the object/vehicle targets at each possible distance. Z(d, n) is constructed from the output of the FFT's from each ramp. At a fixed distance $d_m$, corresponding to the m-th distance bin, an FFT is performed on Z(d=$d_m$, n) to yield the angular frequencies, and therefore velocities, of object/vehicle targets at that distance. The theoretical velocity resolution provided by the FFT is:

$$\Delta v = \frac{\lambda}{2N \cdot T_P}$$

which also corresponds to the length of each velocity bin at the output of the FFT.

Figure 7:
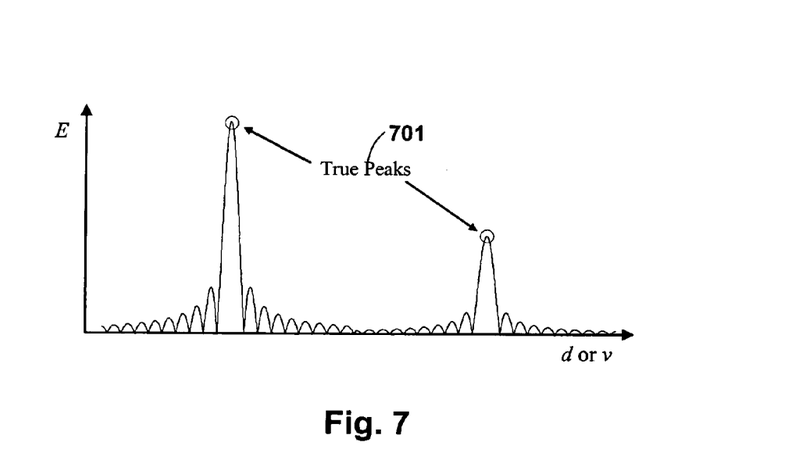
FIG. 7 illustrates smearing of object/vehicle targets in distance or velocity.

Because the spectral analysis of the data is performed on a finite data length, a single object/vehicle target will smear into several adjacent distance and velocity bins as shown in FIG. 7. A peak finding algorithm can be employed to detect the true peaks 701 produced by an object/vehicle target. A way of improving the sidelobes produced by the finite data length is to window the data. The window will cause the sidelobes to decrease in size at a faster rate. However, using a window will increase the size of the main lobe (reducing resolution) and decrease its total height (making it harder to distinguish from noise). The main benefit is that very large object/vehicle targets will not overshadow smaller object/vehicle targets beyond the main lobe.

This present invention has been implemented using the parameters shown in Table 1. The radar system was designed to detect object/vehicle targets up to a range of 300 meters (984 ft). At the maximum range of 300 meters, the radar return is delayed by 2.002 µs, which is 3% of a single ramp sweep time. The frequency difference between the transmitted and received signals produced by this delay is 1.565 MHz. An object/vehicle target that is traveling at the maximum detectable velocity of 83.54 meters/second (187 mph) will produce a Doppler shift of 5.714 kHz, which causes an error in distance of 1.096 m (37% of a distance bin). The system requires 11.2 ms to collect the 128 ramps for a single observation. During a single observation, an object/vehicle target traveling at 83.54 meters/second will travel 0.9356 meters (31% of a distance bin). The DSP requires approximately 250 ms to process an observation, allowing 4 observations per second for the HLT. Between observations, an object/vehicle target traveling at 83.54 meters/second will travel 20.89 m or roughly 7 distance bins.

TABLE 1

Radar system parameters.

| | |
|---|---|
| $f_c$ | 10.25 GHz |
| Tx Power | 10 dBm |
| c | 2.997 × 10⁸ m/s |
| λ | 2.924 cm |
| $F_R$ | 50 MHz |
| $T_R$ | 64.0 μs |
| $T_P$ | 87.5 μs |
| N | 128 ramps |
| M | 512 samples/ramp |
| $F_{Sampling}$ | 8 MHz |
| Δd | 2.997 m |
| Δv | 1.307 m/s |
| $v_{max}$ | ±83.54 m/s |
| FFT Window | Hanning |

Other conventional techniques are available, other than FFT, to perform a spectral analysis of a signal. There are two classes of algorithms for spectrum estimation, nonparametric and parametric. The nonparametric methods begin by estimating the autocorrelation sequence of the data and then Fourier transforming the estimated autocorrelation sequence. The nonparametric methods include the periodogram (FFT), the modified periodogram, Bartlett's method, Welch's method, the Blackman-Tukey method, and the minimum variance method. The parametric methods use a model for the underlying process to estimate the spectrum. They include autoregressive moving average based methods, Pisarenko harmonic decomposition, the MUltiple SIgnal Classification method (MUSIC), the eigenvector method, and ESPRIT. All of these methods are potential candidates for the spectral analysis stages in the distance-velocity processor. The FFT, or periodogram, was chosen for its relative simplicity and robustness.

In addition to determining the distance to an object/vehicle target, a radar can determine the position of an object/vehicle target using a plurality of receive and/or transmit antenna elements comprising an antenna array. When antenna arrays are employed for transmit and/or receive, well-known beam-forming techniques can be employed to determine the angle of incoming signals from each object/vehicle target.

The exemplary embodiment of the present invention can identify the distance and velocity of several object/vehicle targets using a single observation interval of N·$T_P$ seconds. Referring back to FIG. 1, the results from several observations spaced over time can be used by HLT 107, to further refine the estimates made by radar/traffic processor 105. If an observation at one time indicates a moving object/vehicle target, then an observation at a later time should show that same object/vehicle target at a different distance corresponding to the distance that object/vehicle target should have traveled during the time between observations, within a margin that accounts for a possible acceleration or deceleration of the object/vehicle target. HLT 107 can use this information to validate the presence of object/vehicle targets and eliminate invalid observations. A Confidence Factor ("CF") can be assigned to an object/vehicle target which reflects the probability that the detected object/vehicle target is valid. Object/vehicle targets that have been observed several times by the LFM radar and successfully tracked by HLT 107 would be assigned a high CF. The first time an object/vehicle target is observed by the LFM radar would produce a low CF. In addition, the signal strength of the object/vehicle target can affect the assigned CF. Object/vehicle targets producing strong radar returns will have a higher CF.

In addition to verifying the presence and velocity of an object/vehicle target, HLT 107 can also observe an object/vehicle target's acceleration or deceleration. An object/vehicle target's acceleration is determined by finding the change in velocity over a period of time that usually consists of several observations.

The inputs to the radar/traffic processor 105 include the radar target data from either HLT 107 or directly from receiver 103C (in the non-HLT embodiment) and the current signal state data from signal state information module 106. The output of HLT 107 or receiver 103C provides the distance and/or position, velocity, return-signal magnitude, and acceleration of object/vehicle targets in the field of view of the traffic control indicator 101. Also, HLT 107 can provide a CF for each object/vehicle target. The state of the traffic control indicator(s) from signal state information module 106 can be determined in a number of ways, including receiving a message from the traffic control indicator 101, sensing voltages on a conflict monitor, using a photo sensor to directly detect light from the activated traffic signal, measuring the voltage across a cabinet traffic signal controller load switch, or by monitoring the cabinet traffic signal controller serial bus.

The inputs to radar/traffic processor 105 can be used to affect the next state of the intersection or to affect the status of traffic control indicator(s) in the intersection. As an example, radar/traffic processor 105 can acquire the signal state to determine that a light is about to change from yellow to red. At that point in time, radar/traffic processor 105 is aware that a vehicle is approaching the intersection at high velocity. Further, HLT 107 may indicate that the target is accelerating and has a high probability of being an actual vehicle. Based on the vehicle's current distance, velocity, acceleration, and reliability, radar/traffic processor 105 determines that the vehicle will be in the intersection when the cross traffic has a green signal. Radar/traffic processor 105 then signals to the traffic signal controller 102 that a dangerous condition will exist so that it will prevent the cross traffic signal from turning green until the offending vehicle has cleared the intersection.

Figure 8:
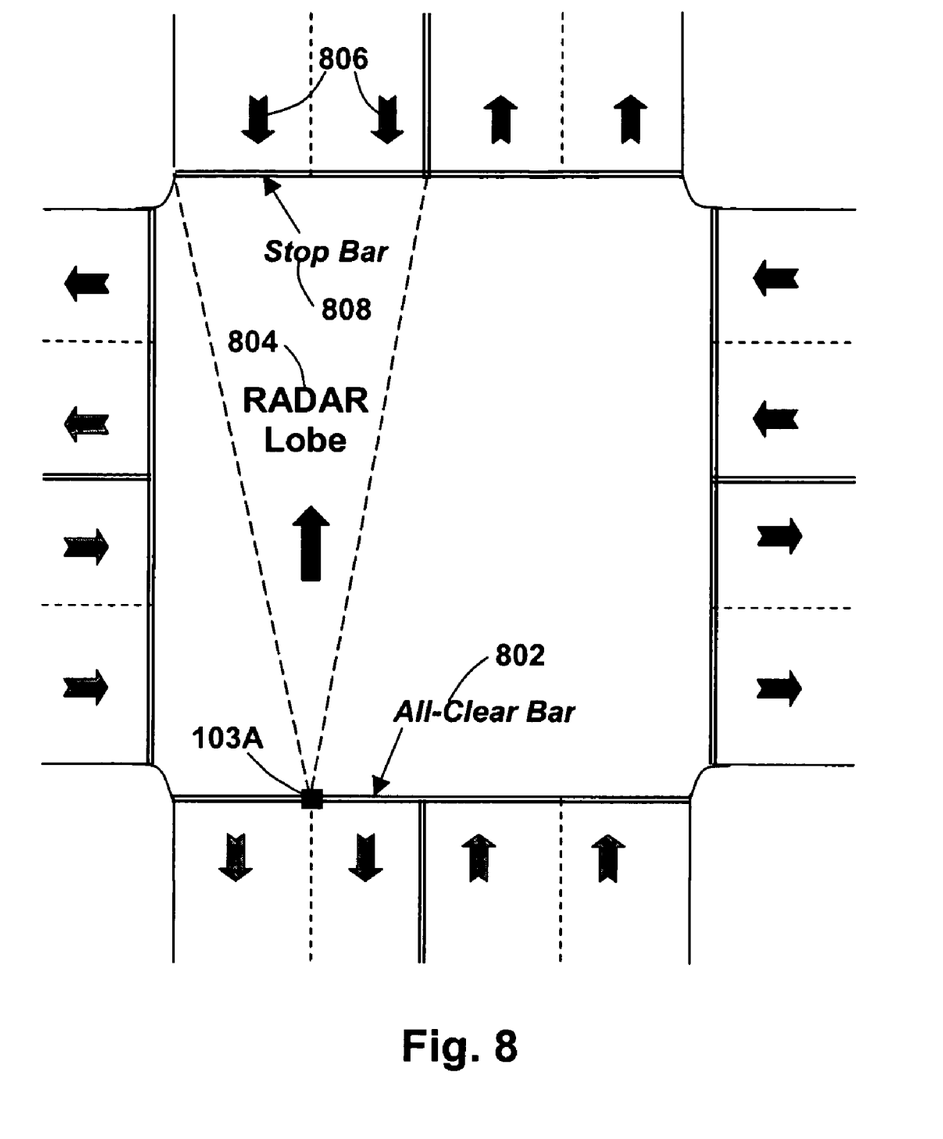
FIG. 8 illustrates a traffic intersection.

Referring now to FIG. 8, an implementation of the present invention is shown relative to an intersection 800. Radar 103A is shown mounted to a traffic signal mast arm directly above all-clear bar 802 producing radar lobe 804 to view oncoming traffic depicted as arrows 806. Oncoming traffic 806 enters intersection 800 at stop bar 808 and exits intersection 800 at all-clear bar 802. Typically, additional radars 103A are mounted in intersection 800 to monitor each traffic approach direction through intersection 800, but are omitted for clarity.

Figure 9:
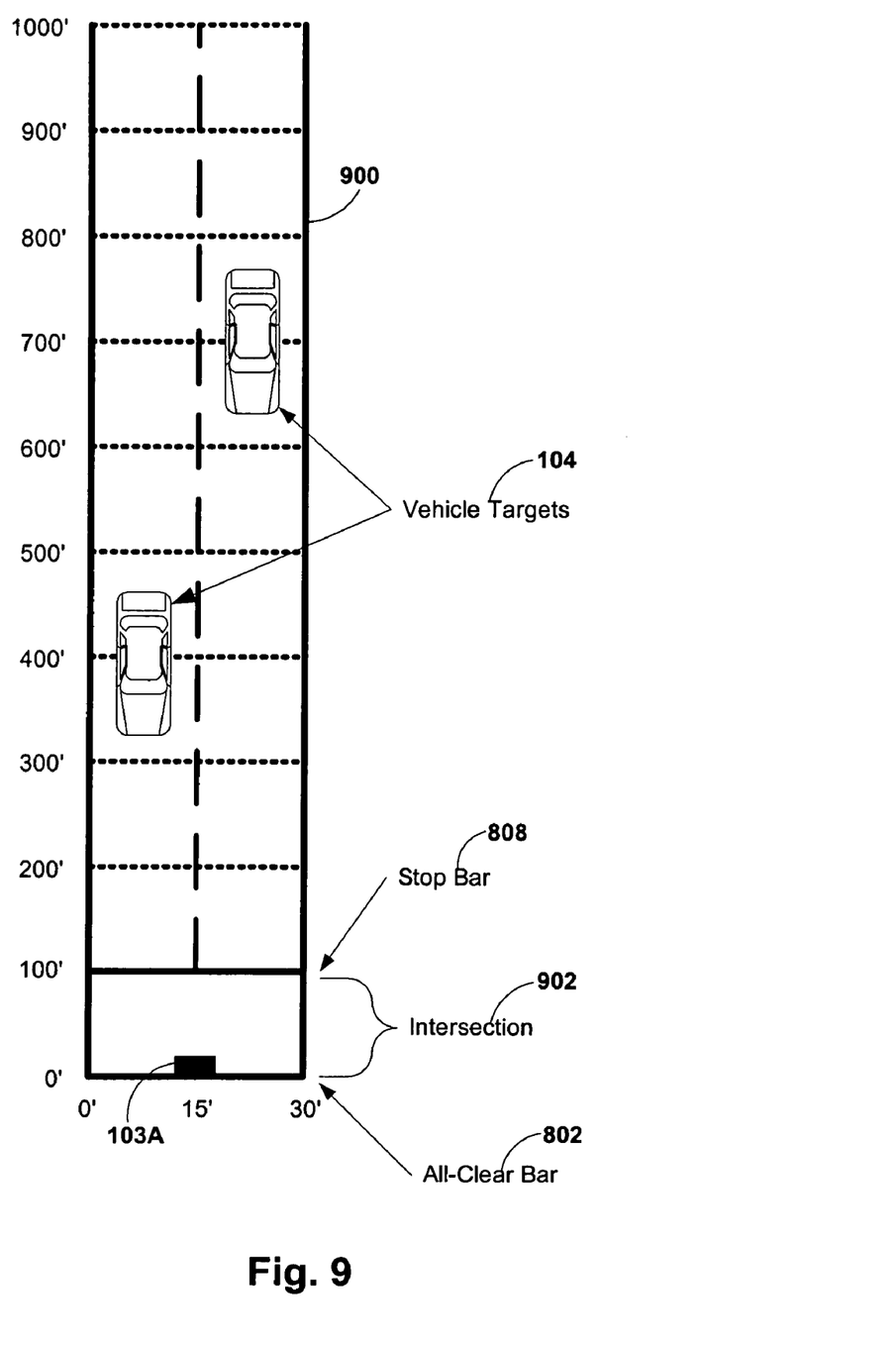
FIG. 9 illustrates a method of interpreting radar data.

Referring now to FIG. 9, a portion of the roadway 900 visible to radar 103A is shown. Object/vehicle targets 104 are detected by radar 103A up to a range of 1000 ft. The portion of intersection 902 shown between stop bar 808 and all-clear bar 802 is 100 ft in length.

Figure 10:
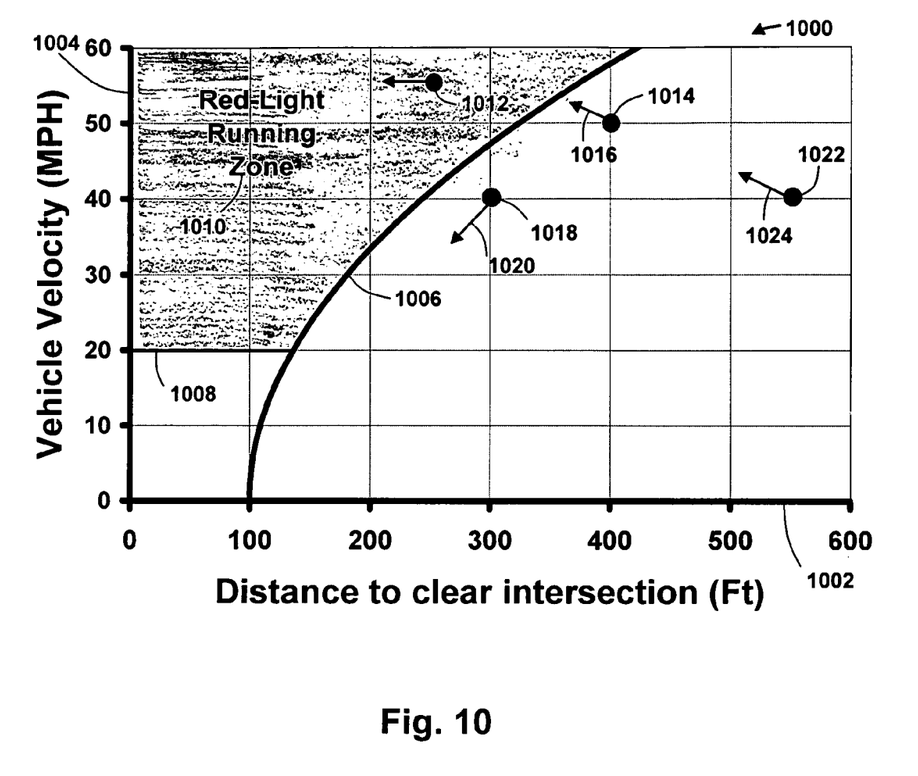
FIG. 10 is a chart illustrating the probability of an object/vehicle target moving at a certain velocity being able to clear an intersection.

With reference now to FIG. 10, there is depicted a method of interpreting radar target data for the purpose of implementing a RLH scheme. Plot 1000 shows the distance in feet from the all-clear bar to a target in the horizontal axis 1002 and the velocity in miles per hour of a target in the vertical axis 1004. In a typical intersection, the traffic signal mast arm is located above the all-clear bar. The intersection on which plot 1000 is based has a distance of 100 ft between the all-clear bar and the stop bar. The deceleration curve 1006 defines the maximum velocity of a vehicle at a given distance from the stop bar such that the vehicle will be able to make a complete stop before crossing the stop bar based on typical aggressive stopping behavior of a car. Although some high-performance vehicles can stop as fast as 33 ft/sec², the typical aggressive stopping deceleration involved when stopping for yellow traffic lights is around 12 ft/sec². Vehicles at a given range that have a velocity above the deceleration curve 1006 are not likely to attempt to stop before entering the intersection. Any vehicles above the deceleration curve 1006 at the moment the light turns red are likely to run the red light. Vehicles traveling below 20 mph typically do not run red lights but instead may be taking a right turn. To limit the area of concern, a minimum velocity threshold 1008 is defined. The region bounded by the deceleration curve 1006, minimum velocity threshold 1008, and vertical axis 1004 is defined as the red-light-running zone 1010. Any vehicles within the red-light-running zone 1010 at the moment the light turns red are likely to run the red light.

A RLH scheme must make a decision to hold the cross traffic lights in the red state at the moment before the intersection controller would typically cycle these lights to the green state. Some intersections will wait to cycle the cross traffic lights to the green state one or two seconds after cycling the main traffic direction signal to the red state. This all-red condition provides some safety margin for the intersection and delays the time that the RLH scheme must make a decision to hold the cross traffic lights red. In one implementation of an RLH scheme, the radar/traffic processor 105 will hold cross traffic red light if any vehicles are present in the red-light-running zone 1010 after the main traffic direction signal has turned red. The radar/traffic processor 105 will continue to hold the cross traffic red light until all vehicles have cleared the red-light-running zone 1010. If a simple HLT 107 is present in the implementation, the radar/traffic processor 105 can continue to hold the cross traffic red light until the predicted position of all vehicles previously detected in red-light-running zone 1010 are clear of red-light-running zone 1010. For instance, vehicle 1012 is detected at 250 feet from the all-clear bar (150 feet from the stop bar) traveling at 55 mph in the red-light-running zone 1010 at the moment the light turns red. Since vehicle 1012 is likely to run the red light, the radar/traffic processor 105 would hold the cross traffic red light until vehicle 1012 is clear of the intersection. If vehicle 1012 was maintaining a constant velocity, a HLT 107 would predict that vehicle 1012 would clear the intersection (i.e. pass the all-clear bar) in about 3.1 seconds. If the radar loses contact with vehicle 1012, the radar/traffic processor 105 can hold the light based on the predicted time that that vehicle 1012 would cross the all-clear bar.

In another implementation of a RLH scheme, a more complex HLT 107 can track the range, velocity, and acceleration of all vehicles tracked by the radar system. The radar/traffic processor 105 can predict the likelihood of a vehicle entering the red-light-running zone 1010 based on the tracked behavior of a vehicle. For instance, vehicle 1014 is tracked to a point 400 ft from the all-clear bar traveling at 50 mph at the moment the light turns red. As denoted by arrow 1016, vehicle 1014 is accelerating. Since drivers tend to decelerate either by applying the brakes or by coasting when a red light is displayed, the acceleration of vehicle 1016 in such close proximity to the red-light-running zone 1010 indicates that vehicle 1016 will likely run the red light. As a result, the radar/traffic processor 105 will decide to hold the cross traffic red light. In another example, vehicle 1018 is tracked to a point 300 ft from the all-clear bar traveling at 40 mph at the moment the light turns red. As denoted by arrow 1020, vehicle 1018 is decelerating. Since vehicle 1018 is not in the red-light-hold zone 1010 and is exhibiting deceleration behavior typical of vehicles stopping at a red light, the radar/traffic processor 105 will not hold the cross traffic red light. In yet another example, vehicle 1022 is tracked to a point 550 ft from the all-clear bar traveling at 40 mph at the moment the light turns red. Since object/vehicle target 1022 is accelerating, as noted by arrow 1022, and so exhibiting behavior typical of a vehicle that will run a red light, the radar/traffic processor 105 will decide to hold the cross traffic red light. However, at a later time, the driver of vehicle 1022 may decide to begin decelerating in order to stop for the red light. At such a time, the radar data may indicate information similar to the range, velocity, and deceleration of vehicle 1018 such that the radar/traffic processor 105 will decide to stop holding the cross traffic red light. This example illustrates a false alarm condition where a vehicle that exhibits behavior typical of a red light runner ultimately stops before entering the intersection.

The cost of false alarms is that the cross traffic red light is delayed from changing to green by a few seconds. However, false alarms will not occur during every light cycle. Further, the presence of such a RLH scheme can eliminate the need for the always-present one to two second all-red condition that exists in many intersections. As a result, the time spent in false alarm conditions may be a similar delay to the existing delays in intersections. The numerous benefits of preventing RLR accidents can also outweigh the cost due to false alarms. An additional effect of the delay imposed by a RLH scheme is a disruption of timed progressions of intersections along a roadway. To maintain synchronization of timed progressions, the RLH scheme can reduce the time of another light cycle (such as the immediately following green cycle) to accommodate the time lost by holding the cross traffic red light.

Another condition that could cause the radar/traffic processor 105 to hold the cross traffic red light includes a vehicle that is traveling at a velocity significantly higher than the posted speed limit, even if said vehicle is slightly decelerating. A large magnitude radar response of a vehicle could indicate that said vehicle is a truck. In this case, a deceleration curve 1006 with a reduced acceleration can be used to define a new and larger red-light-running zone 1010. Further, weather, time of day, or other traffic signal conditions as reported by signal state information module 106 can be used to adjust the red-light-running zone 1010 or the radar/traffic processor algorithm.

The determination of the nature of the flow of a group of object/vehicle targets is predicated upon the use of an alternative embodiment of the invention disclosed herein. If a range and velocity calculation indicates that a continuing group of object/vehicle targets will be present after the regularly scheduled light cycle change from green to yellow, the algorithm may provide immediate remedial control to the traffic signal controller 102, or other similar device, to take action such as, for example, holding all other lights red, while extending the green light to the group of object/vehicle targets, thereby allowing the group of object/target vehicles to traverse the intersection unimpeded. Finally, the determination of whether a vehicle will make a left turn into oncoming or crossing traffic is predicated upon the use of another embodiment of the invention disclosed herein.

The radar/traffic processor 105 will usually interface with a traffic signal controller 102. The interface can include a means for radar/traffic processor 105 to hold the state of the intersection for a period of time (for instance, the "stop time" control input on the traffic controller). Or, the interface could allow radar/traffic processor 105 to set the intersection to an arbitrary state of its choosing based on the current signal state and detected traffic. Further, radar/traffic processor 105 may set the indication of additional warning signals such as for LTW.

Further, the radar/traffic processor 105 can be aware of and/or communicate with other nearby traffic signals or intersections. Such a method can be used to synchronize the signals or to advise the other signals about traffic conditions beyond their individual scope of view. For example, a GLE system at one intersection may detect a group of vehicles passing through the intersection with a distinct beginning and end to the group. The GLE system detecting this group can report to a second GLE system at the next intersection down the road that a group of vehicles of a particular size is approaching at a particular velocity. Based on this information, the second GLE system may alter its intersection cycle to allow the approaching group of vehicles to pass without stopping.

The radar/traffic processor can also log the collected traffic information for use in other applications. This traffic information can include the distance and velocity of approaching object/vehicle targets, potentially dangerous traffic conditions, statistics of RLH, GLE, and LTW usage, and any other information relevant to the intersection state, traffic conditions, and operation of the radar-based target detection and tracking system. This information can be communicated to another application via the police panel, wireless uplink, removable storage media, or other data communication means.

Using the foregoing implementation of a multi-stage spectral processing based receiver permits a more efficient and precise detection and determination of velocity and distance to one or more object/vehicle targets, based on results from a radar transmit beam and a resulting radar echo. The present invention thereby is operable to determine a progressive change in location and a rate of change of the oncoming or crossing targets, thereby determining if a second target object/vehicle target will approach and enter an intersection when a first target object/vehicle target is attempting to traverse the intersection.

The present invention further incorporates the ability for monitoring the illumination-states of a traffic control indicator to determine its color: red, yellow or green and could include a determination of how long it has been in that state. This information is held within a database function that may be used for comparative action with a particular situation and event. The light status at all points of the intersection, coupled with the approaching object/vehicle target's range in confluence with its velocity, provides the basis for a method of determination to interject control of the traffic control indicators.

In alternate embodiments, additional algorithmic functions may allow fine-tuning for determining the probability of running a red light based upon factors that include speed, distance, time of day, time of night, conditions at the intersection, etc.

A technical advantage of this embodiment is the use of the described implementation of radar processing that determines more complete object/vehicle target information including range and velocity with higher accuracy than that which is conventionally available.

Although exemplary embodiments of the present invention have been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims.

We claim:

1. A signaling system, comprising:
 a traffic signal controller adapted to couple to a traffic control indicator, the traffic signal controller adapted to control different states of the traffic control indicator;
 a signal state information module having a state of a traffic control indicator;
 an RF transmitter operable to transmit signals toward at least one object/vehicle target;
 an RF receiver operable to receive reflected signals from at least one said object/vehicle target; and
 a radar/traffic processor coupled to the traffic signal controller and the signal state information module, and adapted to receive signals from the RF receiver;
 the radar/traffic processor having an algorithm operable to determine characteristics of the object/vehicle targets and dynamically cause the traffic signal controller to control a state of the traffic control indicator in response thereto.

2. The signaling system of claim 1, further comprising at least one traffic control indicator adapted to control traffic at a pre-determined roadway location; and
 the traffic control indicator controlled by the traffic signal controller.

3. The signaling system of claim 1, further comprising:
 the algorithm of the radar/traffic processor being adapted to determine, in advance, a likelihood that an object/vehicle target will run a red light generated by the traffic control indicator;
 the algorithm causing the traffic signal controller to maintain the status of an opposing traffic control indicator based on the probability of an object/vehicle target running a red light.

4. The signaling system of claim 1, further comprising:
 the algorithm of the radar/traffic processor being adapted to determine, in advance, a likelihood that a first object/vehicle target will make a left turn toward an opposing second object/vehicle target; and
 the algorithm causing the traffic signal controller to illuminate a warning on a traffic control indicator to the left turning first object/vehicle target.

5. The signaling system of claim 1, further comprising:
 the algorithm of the radar/traffic processor being adapted to determine, in advance, a nature of the flow of approaching object/vehicle targets; and
 the algorithm causing the traffic signal controller to extend a green light given to the flow of approaching object/vehicle targets so as to permit the uninterrupted traversal of the flow of object/targets through the intersection.

6. The signaling system of claim 1, further comprising:
 a sensor adapted to sense one or more of the following parameters: precipitation, time of day and temperature; and
 the algorithm of the radar/traffic processor adapted to dynamically adjust its signals to the traffic signal controller based on the sensed parameters.

7. The signaling system of claim 1, wherein the radar/traffic processor of a first traffic control indicator is in communication with at least one other radar/traffic processor controlling a second traffic control indicator in order to coordinate the signal status of the traffic control indicators.

8. The signaling system of claim 1, wherein the radar/traffic processor is adapted to log traffic information.

9. The signaling system of claim 8, wherein the logged information is communicated to an application.

10. The signaling system of claim 9, wherein the logged information is communicated to the application by way of a data communication channel.

11. The signaling system of claim 1, wherein the RF transmitter and the RF receiver comprise a radar.

12. The signaling system of claim 11, wherein the radar utilizes LFM-CW radio-frequency signals.

13. The signaling system of claim 11, wherein the radar implements a multi-stage spectral processing algorithm to determine distance, velocity and return-signal magnitude of at least one object/vehicle target.

14. The signaling system of claim 13, further comprising a VCO within the radar operable to transmit an LFM-CW radio-frequency signal.

15. The signaling system of claim 14 wherein, the frequency of the VCO signal appears as a linear ramp on a plot of frequency versus time.

16. The signaling system of claim 15, wherein a frequency difference between the transmitted and received radar signals from a single return is a function of an object/vehicle target's distance and velocity.

17. The signaling system of claim 16, further comprising a mixer and low pass filter within the radar operable to extract the frequency difference between a transmitted and received signal by mixing the transmitted and received signal together and then performing a low pass filter operation.

18. The signaling system of claim 17, further comprising a supplemental high pass filter being operable to equalize signals from object/vehicle targets at long range experiencing a large propagation loss with a result that a given object/vehicle target will appear with roughly the same power level at any distance.

19. The signaling system of claim 11, wherein the radar is operable to generate a plurality of ramps with a steep slope having small ramp time.

20. The signaling system of claim 19, wherein the radar is operable to detect both positive and negative velocities.

21. The signaling system of claim 19, wherein the radar implements a multi-stage spectral processing algorithm comprised of fast Fourier transforms ("FFTs").

22. The signaling system of claim 21, further comprising a digital signal processor ("DSP") performing the FFTs.

23. The signaling system of claim 11, in combination with a high-level tracker module coupled to the output of the radar and to the input of the radar/traffic processor.

24. The signaling system of claim 23, wherein the high-level tracker is adapted to process results from several radar observations spaced over time to further refine the estimates made by the radar/traffic processor.

25. The signaling system of claim 23, wherein the high-level tracker is adapted to predict the location of at least one object/vehicle target.

26. The signaling system of claim 25, wherein the prediction is based on the computed acceleration of an object/vehicle target.

27. The signaling system of claim 25, wherein the prediction is based on the computed velocity of the object/vehicle target.

28. The signaling system of claim 23, wherein the high-level tracker is adapted to generate and assign a confidence factor to an object/vehicle target which reflects the probability that the detected object/vehicle target is valid.

29. The signaling system of claim 28, wherein the high level tracker assigns a high confidence factor to object/vehicle targets producing strong radar returns.

30. The signaling system of claim 11, wherein the traffic signal controller and the radar/traffic processor are located in a controller cabinet and the radar is located on a mast arm.

31. The signaling system of claim 11, wherein the radar and radar/traffic processor are located in a traffic control indicator housing.

32. The signaling system of claim 31, wherein the radar/traffic processor and the radar are physically coupled together at a base of a traffic control indicator.

33. The signaling system of claim 11, wherein the traffic control indicator and the radar are housed in a common housing.

34. The signaling system of claim 11, wherein the radar is adapted to determine a position of the object/vehicle target relative to the radar.

35. The signaling system of claim 11, wherein the radar is adapted to determine a distance of at least one object/vehicle target approaching the intersection.

36. The signaling system of claim 11, wherein the radar is adapted to determine both a velocity and distance of multiple object/vehicle targets relative to a traffic control indicator.

37. The signaling system of claim 11, wherein the radar is adapted to determine velocity and distance of object/vehicle targets in multiple lanes of traffic approaching a traffic control indicator.

38. The signaling system of claim 11, wherein the radar is adapted to determine a change in the velocity of an object/vehicle target approaching the intersection.

39. The signaling system of claim 11, further comprising the traffic signal controller controlling a traffic control indicator as a function of the radar and algorithm of the radar/traffic processor.

40. The signaling system of claim 11, wherein the radar/traffic processor is adapted to cause a traffic control indicator to generate an alert upon the occurrence of a pre-determined event.

41. The signaling system of claim 40, wherein the pre-determined event is an object/vehicle target entering an intersection within a pre-determined time frame.

42. The signaling system of claim 40, wherein the pre-determined event is the high probability of an object/vehicle target running a red light.

43. The signaling system of claim 11, further comprising a traffic control indicator adapted to display an alert indicative of an object/vehicle target being likely to run a red light.

44. An apparatus for controlling a traffic intersection, comprising:
   a traffic signal controller coupled to a traffic control indicator, adapted to change states of the traffic control indicator;
   a radar operable to receive signals from a plurality of object/vehicle targets;
   a signal state information module having a state of a traffic control indicator;
   a radar/traffic processor coupled to the traffic signal controller and signal state information module and adapted to receive signals from the radar;
   the radar/traffic processor having an algorithm operable to determine characteristics of the object/vehicle targets and dynamically cause the traffic signal controller to control the states of the traffic control indicator in response thereto.

45. The apparatus of claim 44, further comprising at least one traffic control indicator adapted to control traffic at a roadway intersection.

46. The apparatus of claim 44, wherein the radar transmits an LFM-CW radio-frequency signal.

47. The apparatus of claim 39, wherein the radar implements a multi-stage spectral processing algorithm.

48. The apparatus of claim 42, wherein the multi-stage spectral processing algorithm is comprised of FFTs.

49. A method for determining if an object/vehicle target will enter an intersection including at least one traffic control indicator, comprising:
   receiving a radar echo response indicating the object/vehicle target is approaching the intersection;

determining a range of the object/vehicle target and a velocity of the object/vehicle target; and based on the object/vehicle range and velocity, determining if the object/vehicle target will enter the intersection; and wherein the intersection comprises a plurality of the traffic control indicators at the intersection, and the traffic control indicators are a relational distance from one another.

50. The method of claim 49 further comprising based on the object/vehicle range and velocity determination, determining whether the traffic control indicator should re-sequence.

51. The method of claim 50, further comprising performing at least one of a following re-sequence functionality from a group consisting of:
changing a color state of the traffic control indicator;
changing a color state of other traffic control indicators;
changing a directional signal of the traffic control indicator;
changing a directional signal of other traffic control indicators;
changing a color state of a directional signal of the traffic control indicator;
changing a color state of a directional signal of other traffic control indicators;
applying a visual alerting via the traffic control indicator;
applying a visual alerting via other traffic control indicators;
delaying a changing of a color state of the traffic control indicator;
delaying a changing of a color state of other traffic control indicators;
delaying a changing of a directional signal of the traffic control indicator;
delaying a changing of a directional signal of other traffic control indicators;
delaying a changing of a color state of a directional signal of the traffic control indicator;
delaying a changing of a color state of a directional signal of other traffic control indicators;
delaying an applying of a visual alerting via the traffic control indicator; and
delaying an applying of a visual alerting via other traffic control indicators.

52. The method of claim 51 further comprising performing at least one of the re-sequence functionality in at least one of a following location from a group consisting of:
a traffic intersection comprising the traffic control indicator; and
a traffic intersection comprising other traffic control indicators.

53. A method for determining if an object/vehicle target will enter an intersection including a traffic control indicator, comprising:
receiving a radar echo response indicating the object/vehicle target is approaching the intersection;
determining a range of the object/vehicle target and a velocity of the object/vehicle target; and
based on the object/vehicle range and velocity, determining if the object/vehicle target will enter the intersection; and
further comprising comparing the received radar echo response to a pre-existing traffic model that represents a satisfactory condition.

54. The method of claim 53, wherein the satisfactory condition comprises an object/vehicle target approaching at least one of a following element from a group consisting of:
the traffic control indicator; and
the intersection;
at a distance that would avoid entering the intersection during at least one of a following event from a group consisting of:
a red state of illumination of the traffic control indicator; and
an impending red state of illumination of the traffic control indicator.

55. The method of claim 53, wherein the satisfactory condition comprises an object/vehicle target approaching at least one of a following element from a group consisting of:
the traffic control indicator; and
the intersection;
at a velocity that would avoid entering the intersection during at least one of a following event from a group consisting of:
a red state of illumination of the traffic control indicator; and
an impending red state of illumination of the traffic control indicator.

56. The method of claim 53, wherein the satisfactory condition comprises an object/vehicle target approaching at least one of a following element from a group consisting of:
the traffic control indicator; and
the intersection;
on a condition of a road that would avoid entering the intersection during at least one of a following event from a group consisting of:
a red state of illumination of the traffic control indicator; and
an impending red state of illumination of the traffic control indicator.

57. The method of claim 53, wherein the satisfactory condition comprises an object/vehicle target approaching at least one of a following element from a group consisting of:
the traffic control indicator; and
the intersection;
in a type of weather that would avoid entering the intersection during at least one of a following event from a group consisting of:
a red state of illumination of the traffic control indicator; and
an impending red state of illumination of the traffic control indicator.

58. The method of claim 53, wherein the satisfactory condition comprises an object/vehicle target approaching at least one of a following element from a group consisting of:
the traffic control indicator; and
the intersection;
in a traffic condition that would avoid entering the intersection during at least one of a following event from a group consisting of:
a red state of illumination of the traffic control indicator; and
an impending red state of illumination of the traffic control indicator.

59. The method of claim 53, wherein the satisfactory condition comprises an object/vehicle target approaching at least one of a following element from a group consisting of:
the traffic control indicator; and
the intersection;
at a time that would avoid entering the intersection during at least one of a following event from a group consisting of:
a red state of illumination of the traffic control indicator; and an impending red state of illumination of the traffic control indicator.

60. The method of claim 53, further comprising comparing the received to a pre-existing traffic model on at least one of a following basis:
- continually;
- intermittently;
- based on the determining; and
- based on a specific event.

61. A method for determining if an object/vehicle target will enter an intersection including a traffic control indicator, comprising:
- receiving a radar echo response indicating the object/vehicle target is approaching the intersection;
- determining a range of the object/vehicle target and a velocity of the object/vehicle target; and
- based on the object/vehicle range and velocity, determining if the object/vehicle target will enter the intersection;
- further comprising determining the red state of illumination by performing at least one of a following action from a group consisting of:
- measuring a voltage across a traffic signal controller load switch;
- monitoring a traffic signal controller serial bus;
- sensing voltages on a conflict monitor; and
- using a photo sensor to directly detect light from the activated traffic signal
- further comprising monitoring a state of illumination of a traffic control indicator in order to determine at least one of a following attribute from a group comprising:
- a color of the state of illumination; and
- a length of time of the state of illumination;
- wherein such determination is used in determining if the object/vehicle target will enter the intersection; and
- further comprising monitoring a state of illumination of a plurality of traffic control indicators.

62. The method of claim 61, wherein the determining if the object/vehicle target will enter the intersection comprises:
- determining if a traffic control indicator is in a state that is predeterministic for a red-light run; and
- the object/vehicle target, as indicated by the radar echo response, is approaching the intersection in a manner that could improperly place the object/vehicle target in the intersection during at least one of a following event from a group consisting of:
  - a red state of illumination of the traffic control indicator; and
  - an impending red state of illumination of the traffic control indicator.

63. The method of claim 61, further comprising determining a probability of running a traffic control indicator in a red state of illumination based upon at least one of a following factor from a group consisting of:
- a distance of the object/vehicle target;
- a velocity of the object/vehicle target;
- a road condition;
- a traffic condition;
- an intersection condition;
- a type of weather;
- a time of day; and
- a time of night.

64. The method of claim 61, further comprising overriding the traffic signal controller by a traffic light control system.

65. The method of claim 64, wherein the overriding comprises at least one of a following element from a group consisting of:
- changing other traffic control indicators to a different state of illumination;
- changing other traffic control indicators to a visual signal that indicates an anomaly condition;
- holding other traffic control indicators at a given state of illumination; and
- holding other traffic control indicators at a visual signal that indicates an anomaly condition.

* * * * *